United States Patent
Buchanan et al.

(10) Patent No.: US 6,790,159 B1
(45) Date of Patent: Sep. 14, 2004

(54) METHOD OF CONTROLLING A DUAL CLUTCH TRANSMISSION

(75) Inventors: Mark Buchanan, Rochester Hills, MI (US); Russell Lemon, Illawong (AU); Melissa Koenig, Howell, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/371,378

(22) Filed: Feb. 21, 2003

(51) Int. Cl.$^7$ .............................................. B60K 41/02
(52) U.S. Cl. ........................... 477/86; 477/174; 701/51
(58) Field of Search ..................... 477/86, 174, 175, 477/176; 701/51, 54

(56) References Cited

U.S. PATENT DOCUMENTS

| | | | |
|---|---|---|---|
| 3,589,493 A | 6/1971 | Smith | 192/3.52 |
| 4,461,188 A | 7/1984 | Fisher | 74/330 |
| 4,513,631 A | 4/1985 | Koivunen | 74/360 |
| 4,544,057 A | 10/1985 | Webster et al. | 192/0.076 |
| 4,827,794 A | 5/1989 | Muller et al. | 74/334 |
| 4,905,801 A * | 3/1990 | Tezuka | 477/87 |
| 5,050,714 A * | 9/1991 | Kurihara et al. | 477/176 |
| 5,630,773 A * | 5/1997 | Slicker et al. | 477/176 |
| 5,662,198 A | 9/1997 | Kojima et al. | 192/87.11 |
| 5,711,409 A | 1/1998 | Murata | 192/87.11 |
| 5,720,203 A | 2/1998 | Honda et al. | 74/325 |
| 5,782,710 A * | 7/1998 | Kosik et al. | 477/86 |
| 5,890,392 A | 4/1999 | Ludanek et al. | 74/331 |
| 5,915,512 A | 6/1999 | Adamis et al. | 192/3.61 |
| 5,950,781 A | 9/1999 | Adamis et al. | 192/3.61 |
| 5,964,675 A * | 10/1999 | Shimada et al. | 477/86 |
| 5,966,989 A | 10/1999 | Reed, Jr. et al. | 74/331 |
| 5,979,257 A | 11/1999 | Lawrie | 74/335 |
| 6,006,620 A | 12/1999 | Lawrie et al. | 74/335 |
| 6,012,561 A | 1/2000 | Reed, Jr. et al. | 192/48.2 |
| 6,044,719 A | 4/2000 | Reed, Jr. et al. | 74/330 |
| 6,286,381 B1 | 9/2001 | Reed, Jr. et al. | 74/336 |
| 6,364,809 B1 * | 4/2002 | Cherry | 477/86 |
| 6,463,821 B1 * | 10/2002 | Reed et al. | 477/174 |
| 6,656,090 B2 * | 12/2003 | Matsumura et al. | 477/175 |

FOREIGN PATENT DOCUMENTS

GB     2 036 203     11/1980

* cited by examiner

Primary Examiner—Charles A. Marmor
Assistant Examiner—Eric M. Williams
(74) Attorney, Agent, or Firm—Bliss McGlynn, P.C.; Greg Dziegielewski

(57) ABSTRACT

A method of controlling the torque transferred across the engaged clutch of a vehicle having a dual clutch transmission to provide predetermined engine acceleration for each gear based on the engine throttle position and subsequent changes of clutch speed that are in response to operatively varying the torque transferred across the engaged clutch as the engine accelerates to a predetermine speed based on the throttle position. The method includes the steps of determining the engine throttle position, determining the currently engaged gear of the transmission, and sensing the speed of the driven member of the engaged clutch. Then, a target engine speed is determined based on the engine throttle position, the currently engaged gear, and the clutch speed. The torque transferred across the engaged clutch is then continuously varied to cause the engine to accelerate toward the target engine speed.

12 Claims, 6 Drawing Sheets

METHOD OF CONTROLLING A DUAL CLUTCH TRANSMISSION

BACKGROUND OF THE INVENTION

1. Field of the Invention

The present invention relates, generally to the control of a dual clutch transmission and, more specifically, to a method for controlling the acceleration of an engine of a motor vehicle by controlling the torque transfer of the clutches of a dual clutch transmission.

2. Description of the Related Art

Generally speaking, land vehicles require a powertrain consisting of three basic components. These components include a power plant (such as an internal combustion engine), a power transmission,-and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first, and oldest type is the manually operated transmission. These transmissions include a foot operated start-up or launch clutch to engage and disengage the driveline with the power plant and a gearshift lever to selectively change the gear ratios within the transmission. When driving a vehicle having a manual transmission, the driver must coordinate the operation of the clutch pedal, the gearshift lever and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. However, one disadvantage of the manual transmission is that there is an interruption in the drive connection during gear shifting. In addition, there is a great deal of physical interaction required on the part of the operator to shift gears in a manually operated transmission.

The second type of transmission employed in a conventional motor vehicle is an automatic transmission. Automatic transmissions offer ease of operation. The driver of a vehicle having an automatic transmission is not required to use both hands, one for the stee ring wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween.

At low speed ratios, RPM output/RPM input, torque converters multiply or increase the torque translation from the engine. During torque multiplication, the output torque is greater than the input torque for the torque converter. However, at high speed ratios there is no torque multiplication and the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of a power interruption in the drive connection between the input shaft and the output shaft during sequential gear shifting. Power interrupted shifting results in a harsh shift feel that is generally considered to be unacceptable when compared to the smooth shift feel associated with most conventional automatic transmissions.

To overcome this problem, other automated manual type transmissions have been developed that can be power-shifted to permit gearshifts to be made under load. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 4, 2000 to Reed, Jr. et al for an Electro-mechanical Automatic Transmission having Dual Input Shafts. These particular variant types of automated manual transmissions have two clutches and are generally referred to simply as dual, or twin, clutch transmissions. The dual clutch structure is most often coaxially and cooperatively configured so as to derive power input from a single engine flywheel arrangement. However, some designs have a dual clutch assembly that is coaxial but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two disc clutches each with its own clutch actuator to control the engagement and disengagement of the two clutches independently of one another. While the clutch actuators may be of the electromechanical type, since a lubrication system within the transmission is still a necessity and therefore require a pump, some dual clutch transmissions utilize hydraulic shifting and clutch control. These pumps are most often gerotor types, and are much smaller than those used in conventional automatic transmissions because they typically do not have to supply a torque converter. Thus, parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform up-shifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved.

While these power-shift dual clutch transmissions overcome several drawbacks associated with conventional transmissions and the newer automated manual transmissions, it has been found that controlling and regulating the automatically actuated dual clutch transmissions is a complicated matter and that the desired vehicle occupant comfort goals have not been achievable in the past. There are a large number of events that must be properly timed and executed within the transmission to achieve smooth and efficient operation, not only during the power-shifting events but also throughout the entire operating range of the transmission as well. To this point, conventional control schemes and methods have generally failed to provide this capability. Accordingly, there exists a need in the related art for better methods of controlling the operation of dual clutch transmissions.

One particular area of improvement that is needed is in the control of engine acceleration through the control of the torque transferred across of the clutches of the transmission. The nature of the dual clutch transmission, that is, the manual style configuration discussed above that employs automatically actuated disc type clutches, requires accurate control of the clutch engagement and thus the torque transferred across them. More specifically, it is desirable to operate the clutches of the dual clutch transmission so that acceleration of the engine, and thus the vehicle, through each of its gears is controlled by varying the amount of torque transferred across the clutch, or in other words to induce certain amounts of clutch slip in certain parts of the vehicle's operating range.

Control of the torque transferred across the clutches, and thus the control of the engine acceleration, is required to provide smooth operation, avoid hard or noticeable lockup of the clutch to the transmission, and to provide efficient engine-to-transmission interaction. The control schemes for dual clutch transmissions known in the related art are incapable of adequately providing for fine control of engine acceleration to satisfy this need. Specifically, they lack the ability to finely control the torque transferred across the clutches to achieve the high degree of accuracy needed for smooth transmission and engine operation. Additionally, current control methods for the clutches of a dual clutch transmission generally concern themselves with simple engagement and disengagement of the clutch assemblies and fail to adequately provide for the corresponding control of all aspects and phases of engine acceleration control, vehicle movement, and the preparation for movement.

In that regard, there are some prior art clutch control methods for dual clutch transmissions of a more specialized nature that are referred to as launch methods or strategies. Typically, these methods are directed to limited control over engine acceleration and vehicle movement from a standing start to initial portion of the vehicle's operating range. These conventional launch strategies are moderately successful at getting the vehicle moving in an acceptable manner. However, the term launch may also be extended, particularly in the case of the dual clutch transmission, to encompass not only the movement of the vehicle from a standing start but also to refer to all clutch activity (i.e. torque transfer) within each of the available gears, outside of a gearshift operation. Thus, in this greater context the term "launch" as used here means the clutch control of the torque transfer in each gear, so that the control of the engine acceleration (and deceleration) through each gear of the transmission (not including the shifts) follows a launch strategy. This highlights a further inadequacy in the prior art dual transmission clutch control schemes. Specifically, the clutch control schemes generally known in the related art are primarily designed to move a stationary vehicle and are incapable of adequately providing for control of the torque transfer for all activities of the clutches and are not designed to "launch" each of the gears of the transmission. This inadequacy, like others discussed above, also directly effects the smoothness and efficiency of the entire powertrain of the vehicle.

For example, some current dual clutch transmission control methods cannot prevent adverse engine responses to clutch engagement, such as engine lugging or over-revving. The lugging effect occurs when a clutch is heavily engaged without adequate engine speed, and the engine becomes excessively loaded, causing surges and roughness. The over-revving effect occurs when the clutch engagement is slow and behind the acceleration of the engine so that the slip is excessive and power is lost. Other current control methods that overcome lugging and over-revving for first gear and the initial start of the vehicle do not prevent these problems in any other gear or in any other part of the vehicle operating range. Accordingly, there remains a need in the art for a method to operatively and actively control the launch of each of the gears of the dual clutch transmission by providing control over all the torque transfer activities of the clutches.

SUMMARY OF THE INVENTION

The disadvantages of the related art are overcome by the method of the present invention for controlling the engine speed of a vehicle having a dual clutch transmission. More specifically, the present invention is directed to a method of controlling the torque transferred across the engaged clutch of a vehicle having a dual clutch transmission to provide a predetermined engine acceleration curve for each gear based on the engine throttle position and subsequent changes of clutch speed that are in response to operatively varying the torque transferred across the engaged clutch as the engine accelerates to a predetermined speed based on the throttle position. The method includes the steps of determining the engine throttle position, determining the currently engaged gear of the transmission, and sensing the speed of the driven member of the engaged clutch. Then, a target engine speed is determined based on the engine throttle position, the currently engaged gear, and the clutch speed. The torque transferred across the engaged clutch is then continuously varied to cause the engine to accelerate toward the target engine speed. Thus, the engaged clutch is operatively slipped to smoothly cause the engine to track a predetermined target speed, providing efficient operation with the desired smooth driving feel. In this way, hard clutch lock-ups and engine lugging are avoided.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
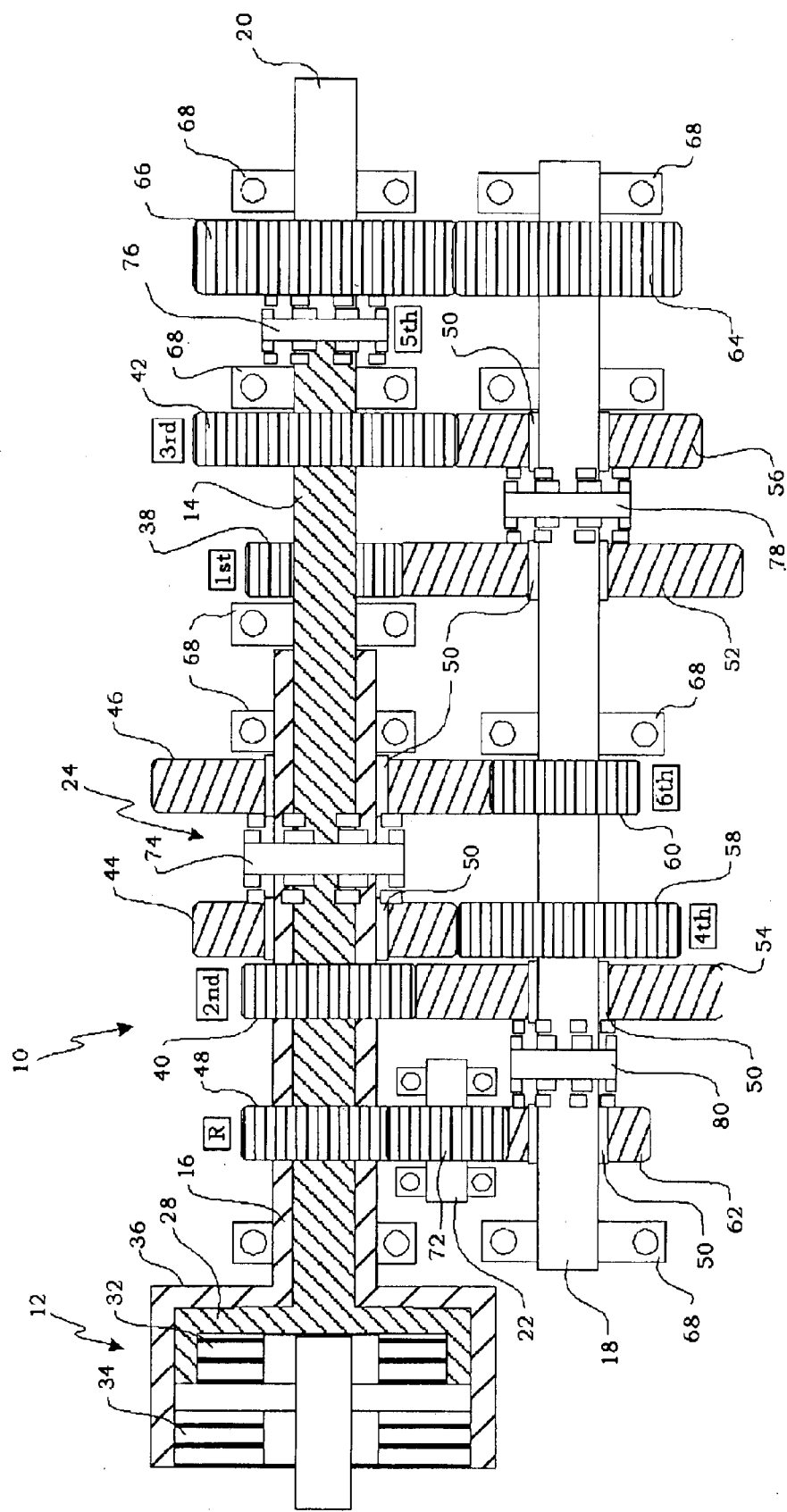
FIG. 1 is a generalized schematic illustration of a dual clutch transmission as controlled by the method steps of the present invention.

A representative dual clutch transmission that may be controlled by the present invention is generally indicated at 10 in the schematic illustrated in FIG. 1. Specifically, as shown in FIG. 1, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, and a plurality of synchronizers, generally indicated at 24.

The dual clutch transmission 10 forms a portion of a vehicle powertrain and is responsible for taking a torque input from a prime mover, such as an internal combustion engine and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacting with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators (not shown) to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly disposed on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

In the preferred embodiment, the counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly retained on the output shaft 20. The output shaft 20 extends outward from the transmission 10 to provide an attachment for the remainder of the powertrain.

In the preferred embodiment, the reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gear 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that they are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its shaft when moved off of a center neutralized position to the right and engage another gear to its shaft when moved to the left.

It should be appreciated that the operation of the dual clutch transmission 10 is managed by some type of control device such as an electronic control unit (ECU) that oversees the functioning of the transmission 10, or by an electronic control unit for the vehicle in which the dual clutch transmission 10 may be installed. Regardless, there exists a control device, beyond the scope of this invention, that controls and operates the dual clutch transmission through a stored control scheme or series of control schemes of which the present invention is merely a part. The control device having the capability of providing the proper voltages, signals, and/or hydraulic pressures to operate the transmission 10 and particularly the clutch engagement functions. Thus, the control method of the present invention as described below may be a standalone process or merely a portion, such as a sub-routine, or series of sub-routines, of a larger control scheme within the ECU.

The first and second clutch mechanisms 32 and 34 of the dual, coaxial clutch assembly 12 are operatively engaged and disengaged in a coordinated manner relative to the actuator of the various gear sets by the synchronizer 24 to selectively transfer torque to the output shaft 20. By way of example, if torque is being transferred to the drive wheels of the vehicle to initiate movement from a standing start, the lowest, or first, gear ratio of the dual clutch transmission 10 will likely be engaged. Therefore, as seen in FIG. 1, synchronizer 78 will be driven to the left to engage the first counter gear 52 to the counter shaft 18 and the first clutch mechanism 32 will be engaged to transfer torque from the engine to the output shaft 20 through the first gear set. When vehicle speed increases and the ECU determines that the conditions require a shift to the second gear set, synchronizer 80 will first be driven to the right to engage the second counter gear 54 to the counter shaft 18. Then the second clutch mechanism 34 will be engaged as the first clutch mechanism 32 is disengaged. In this manner, a powershift, where no power interruption occurs, is effected. Additionally, while engaged and driving a particular gear, the first and second clutch mechanisms 32 and 34 are controlled by certain stored routines that provide varying amounts of engagement force to the clutch discs and thereby operatively control the amount of torque transferred across the clutches and the resultant engine speed. Of particular concern to this application is the speed control routine that causes the engine speed to track a predetermined target speed for given input parameters by varying the applied engagement pressure across the clutch discs. In that regard, the actuating components of the first and second clutch mechanisms 32 and 34 are not shown and it should be appreciated there may be of any number of suitable known devices that are capable of selectively varying the applied engagement pressure between the clutch discs, such as, but not limited to mechanical actuators, hydro-mechanical actuators, electromechanical actuators, or fully electrical actuators.

For example, in one embodiment of the dual clutch transmission 10, the first and second clutch mechanisms 32 and 34 of the dual, coaxial clutch assembly 12 are actuated by hydraulic pressure supplied by the first and second clutch actuator solenoids, respectively. The clutch actuator solenoids are schematically represented, and generally indicated at 120 and 122 in FIG. 2, and as shown, are supplied with pressurized hydraulic fluid by a regulating circuit generally indicated at 82. It should be appreciated that, as previously mentioned, the actuation of the components of the dual clutch transmission 10 may be electrical rather than electro-hydraulic, and in that case, the first and second clutch actuator solenoids 120, 122 would be replaced by some type of physical drive devices to operatively engage the first and second clutch mechanisms 32 and 34.

Figure 2:
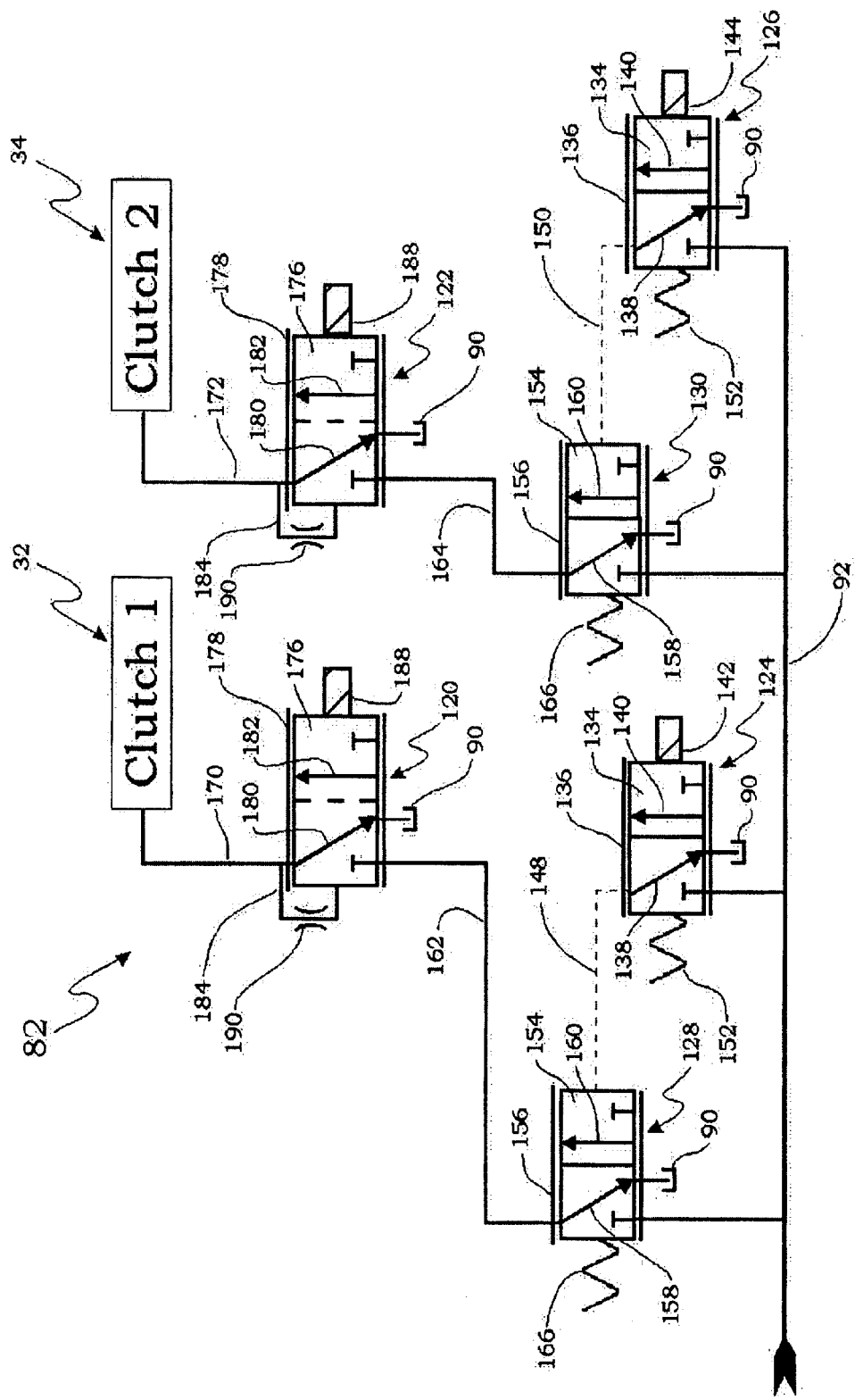
FIG. 2 is a schematic illustration of the electro-hydraulic control circuit for the clutch actuators of a dual clutch transmission controlled by the method steps of the present invention.

As shown in FIG. 2, for this example of a dual clutch transmission 10, there are two on/off solenoids, generally indicated at 124 and 126, and two enable valves, generally indicated at 128 and 130 that provide the operative hydraulic pressure to the clutch actuator solenoids 120 and 122. A main pressure supply line 92 that is operatively connected to a source of pressurized hydraulic fluid from a pump within the transmission 10 (not shown) provides the two on/off solenoids 124 and 126 with pressurized hydraulic fluid. The on/off solenoids 124 and 126 each have a selectively movable valve member 134 disposed within a valve body 136 that has internal hydraulic flow passages 138 and 140. When energized, the valve members 134 of the on/off solenoids 124 and 126 are driven to the left, as illustrated, by actuators 142 and 144 respectively. The on/off solenoids 124 and 126 then selectively provide hydraulic pressure though pressure lines 148 and 150 to act upon the right sides of enable valves 128 and 130, as illustrated in FIG. 2. In their normally de-energized state, biasing member 152 causes the valve member 134 to be driven back to the right and any residual pressure in pressure lines 148 or 150 is bled off and routed back to the fluid sump, shown at 90.

The enable valves 128 and 130 also each have a selectively movable valve member 154 disposed within a valve body 156 that has internal hydraulic flow passages 158 and 160. The applied hydraulic pressure from the on/off solenoids 124 and 126 act to push the valve members 154 of the enable valves 128 and 130 to the left to open the internal hydraulic passage 158 and provide hydraulic pressure to clutch actuator solenoid 120 and 122 through the pressure supply lines 162 and 164. In their normally de-energized state biasing member 166 causes the valve member 154 to be driven back to the right and any residual pressure in pressure lines 162 or 164 is bled off and routed back to the fluid sump, shown at 90.

Though beyond the scope of this invention and not shown here, the two enable valves 128 and 130 are also in fluid communication with, and hydraulically feed, the synchronizer actuator solenoids that drive the synchronizers 24 of the transmission 10 between their engaged and neutralized positions. Thus, it should be appreciated that two on/off solenoids 124 and 126, and two enable valves 128 and 130 also have other hydraulic switching functions within the transmission 10, such that the on/off solenoids 124 and 126 are selectively operable to provide and remove hydraulic actuating pressure and prevent uncontrolled actuation of the mechanisms within the transmission 10.

When the on/off solenoids 124 and 126 are actuated and the enable valves 128 and 130 have charged the pressure supply lines 162 and 164 to the clutch actuator solenoids 120 and 122, the first and second clutch mechanisms, generally indicated at 32 and 34, are controllable. The clutch actuator solenoids 120 and 122 are in fluid communication with the clutch mechanisms 32 and 34 through clutch pressure lines 170 and 172 respectively. Each of the clutch actuator solenoids 120 and 122 have a selectively movable valve member 176 disposed within a valve body 178 that has internal hydraulic flow passages 180 and 182. The clutch actuator solenoids 120 and 122 also have external hydraulic feedback passages 184. A solenoid 188 selectively drives the valve member 176 operatively from its de-energized position biased to the left as illustrated in FIG. 2 to its energized position which allows the flow of pressurized hydraulic fluid to flow through internal passage 182 out the clutch pressure line 170, 172 to the clutch 32, 34.

The clutch actuator solenoids 120 and 122 are current controlled, variable regulating valves, such that a given control current applied to solenoids 188 will result in a particular pressure output in the clutch pressure lines 170, 172. Regulation of the clutch actuator solenoids 120, 122 is further provided by the pressure feedback through passages 184. Similar to the on/off solenoids 124 and 126 and the enable valves 128 and 130, the clutch actuator solenoids 120 and 122 have internal passages 180 to send residual pressure from the clutch pressure lines 170 and 172 back to the sump 90 when the solenoid is de-energized.

The method of controlling the dual clutch transmission from launch and operation in each gear will now be discussed in greater detail with reference to FIGS. 3–6. The method of the present invention is initialized at some point in the operation of the vehicle when it is determined that the engine should be under the acceleration control of the launch strategy for the currently engaged gear. It should be appreciated that the method of the present invention is designed for the control of all clutch activity, with the exception of gear shifting events. However, the present invention, as disclosed herein, may be equally employed in only portions of the engine and clutch operating ranges for each gear of the transmission 10, if so desired. In that regard, as will be discussed in greater detail below, the method of the present invention employs an engine acceleration curve that has a number of sections separated by predetermined threshold points in which the different sections determine the manner of the control torque transfer across the engaged clutch. Thus, the use of the method of the present invention, its initialization, and its duration of operation within the operating range of the engine and motor vehicle is dependant on a higher order control program or control unit that dictates when the present invention is to be applied.

Figure 3:
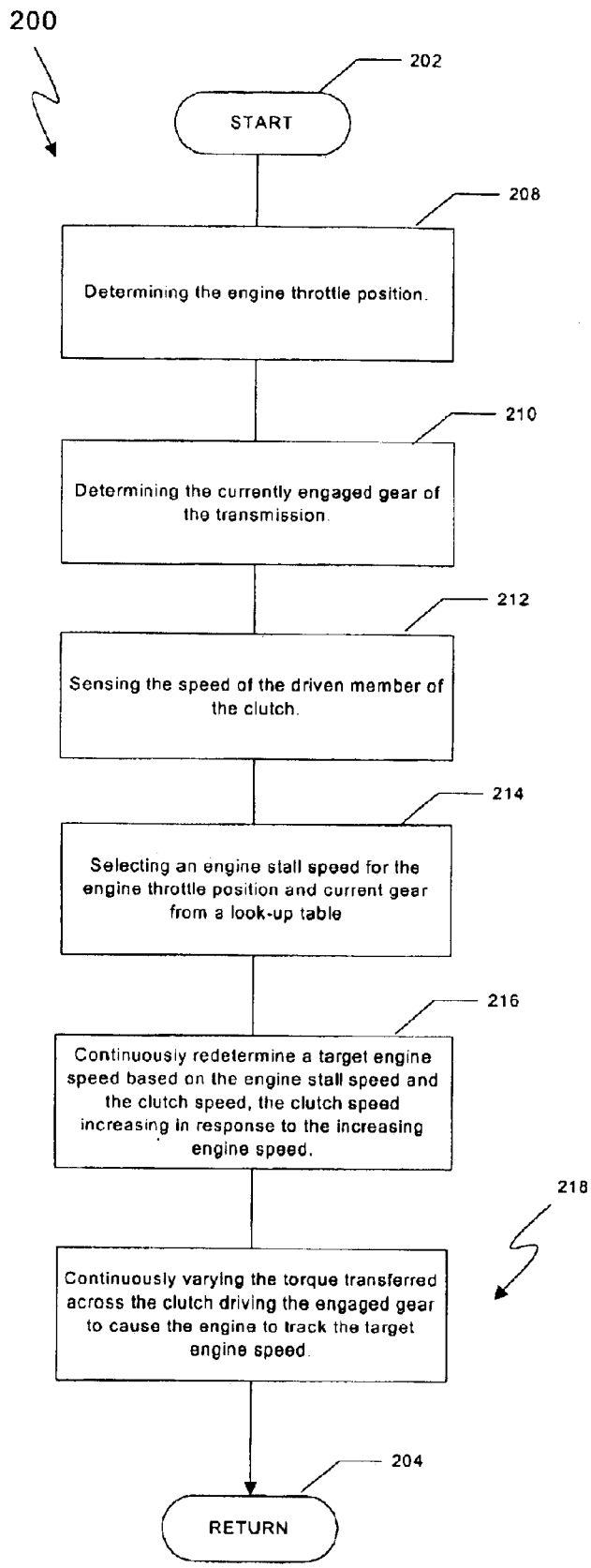
FIG. 3 is a block diagram flowchart of the method of the present invention for controlling a dual clutch transmission.
Figure 6:
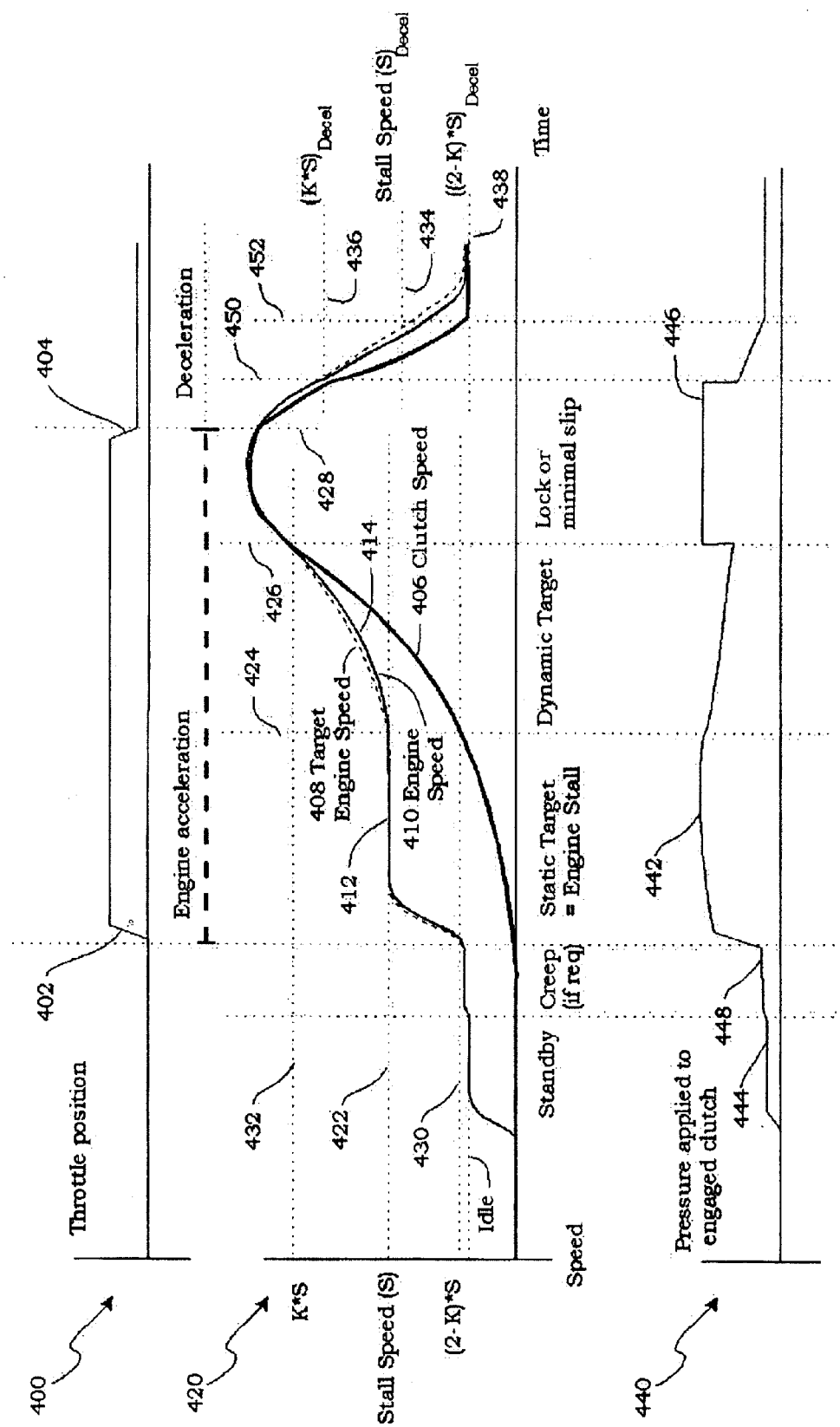
FIG. 6 is a graph of the acceleration curve of the method of the present invention for controlling a dual clutch transmission.

The method of the present invention, as generally indicated at 200 in FIG. 3, controls the torque transferred across the engaged clutch 32, 34 of a vehicle having a dual clutch transmission 10 to provide a predetermined engine acceleration curve shown in FIG. 6 for each gear based on the engine throttle position and subsequent changes of clutch speed that are in response to operatively varying the torque transferred across the engaged clutch as the engine accelerates to a predetermined speed based on the throttle position. The method begins at the start entry block 202 and includes the steps of determining the engine throttle position as generally indicated at 208, determining the currently engaged gear of the transmission 10 as generally indicated at 210, and sensing the speed of the driven member of the clutch as generally indicated at 212. A target engine speed based on the engine throttle position, the currently engaged gear, and the clutch speed is then determined, as generally indicated at 214. The method then continuously varies the torque transferred across the engaged clutch 32, 34 to cause the engine to track the target engine speed, as generally indicated at 218 thus creating the acceleration curve shown in FIG. 6. In this manner, the curve is created based on the changes of clutch speed that are in response to operatively varying the torque transferred across the engaged clutch as the engine accelerates to a predetermined speed based on the throttle position. When the method of the present invention is disabled or otherwise turned off by the ECU or a higher level command function, the method exits at step 204.

Once the ECU, or other control device, makes a determination that (by some other set of control parameters beyond the scope of this invention) engine acceleration control is required, the method of the present invention is initiated. More specifically, and by way of non-limiting example, the method steps generally indicated in FIG. 3 may include those generally indicated at 220 and described with reference to FIG. 4. Thus in this example of the present invention, once initialized at the start block 222, the method steps move to process block 224, which determines the engine throttle position, then to process block 226 to determine the currently engaged gear, and to process block 228 to sense the speed of the driven member of the engaged clutch. These values are used at process block 230 to determine a target engine speed based on the engine throttle position (224), the currently engaged gear (226), and the clutch speed (228). It should be appreciated that the reference to clutch speed throughout this specification is taken to simply mean the rotational speed of the driven member of the particular clutch assembly being discussed.

Once a target engine speed has been determined at process block 230, process block 232 determines the difference between the target engine speed and the actual (measured) engine speed by making a summation of the two values to produce a speed error. The speed error from process block 232 is fed to process block 234, which determines a dynamic torque signal. Process block 234 represents a conversion circuit that changes the raw speed error value into an error signal that is proportioned relative to a predetermined range. The proportional error signal is the dynamic torque signal that represents the amount of torque that must be transferred across the engaged clutch to cause the engine to track the target engine speed in response to the throttle position. In other words, the actual engine speed is determined, the target engine speed is compared to the actual engine speed to produce a speed error signal, and the value of the speed error signal is proportioned to a relative value within a predetermined range to provide the dynamic torque signal. The dynamic torque signal is then used to form the basis for a target torque signal that is then used to vary the torque transfer across the engaged clutch to cause the engine to track the target engine speed.

It should be appreciated that the target torque signal is a composite signal that comprises the dynamic torque signal discussed above and a steady state torque signal. The term "dynamic" is used in this context to signify that the torque transfer across the engaged clutch is being varied according to the difference between the target engine speed and the actual engine speed. Thus, the speed error is reduced as the actual engine speed closes on the target engine speed. The "steady state" torque signal represents an additional amount of torque that must be transferred across the engaged clutch to compensate for changes in driving conditions that would otherwise disrupt the speed control of the engine using the dynamic signal alone. As will be discussed in greater detail below, the steady state torque signal is derived as the difference between predicted changes to the engine speed and the actual change based on known engine and transmission response times to changes in the target torque signal. Thus, if the engine speed is not changing in accordance with known response times, then external forces have occurred than must be accounted for. For example, if the vehicle were to encounter a hill while the dynamic torque signal was acting alone to control the engine speed, some of the change in torque transfer commanded by the dynamic torque signal would be lost to the increased load and the engine speed would not change as expected. Thus, the steady state torque signal is determined and added to the dynamic torque signal so that the dynamic torque signal will control the engine speed in a "steady state" manner without any detrimental influences from changing driving conditions.

Figure 4:
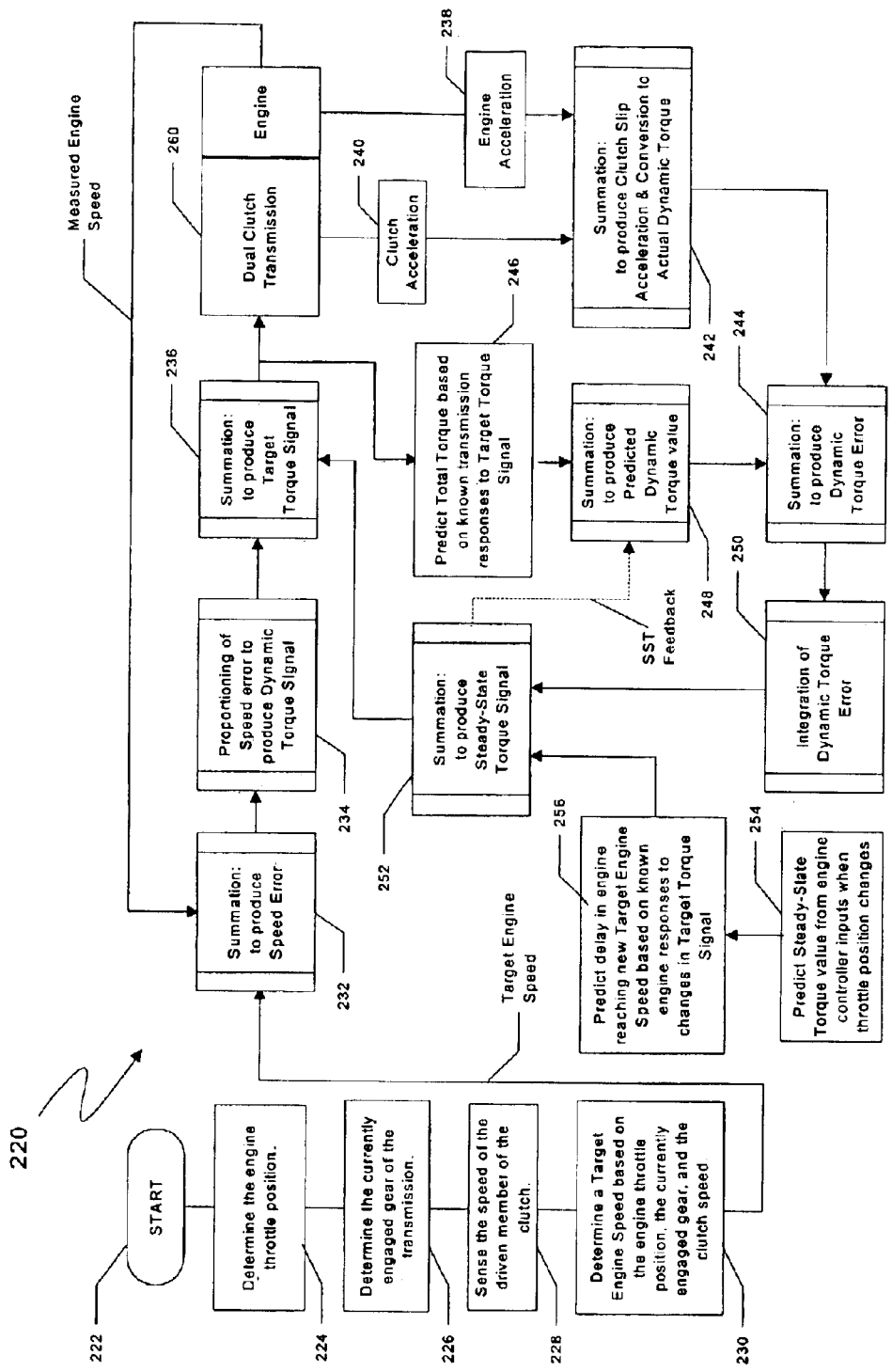
FIG. 4 is a block diagram flowchart of the method of the present invention for controlling a dual clutch transmission.

Therefore, process block 236 sums the dynamic torque signal and the steady-state torque signal to provide a target torque signal that represents the total amount of torque that must be transferred across the engaged clutch to cause the engine to track the target engine speed in response to the throttle position and changes in the driving conditions. Then, the target torque signal is used to vary the torque transferred across the engaged clutch to cause the engine to track the target torque signal. This is shown in FIG. 4 by the flow path from process block 236 to the transmission and engine assembly representatively illustrated in block 260. It should be appreciated that as the actual engine speed reaches, or is about to reach, the target engine speed for the particular clutch speed from process block 228, that a new target engine speed is determined within process block 230 to cause another speed error at process block 232 so that the engine is caused to accelerate and track the new target engine speed. This is a repetitive process so that an engine speed loop is determined by each new target engine speed in response to the changes in clutch speed as the engine reaches the current target engine speed.

To obtain a steady state torque signal that is summed with the dynamic torque signal at process block 236, a measured value representing the actual dynamic torque produced must be derived from the engine and clutch (FIG. 4, block 260). The measured dynamic torque is generally derived by calculations that use engine and transmission output measurements. For example, the acceleration of the engine is determined at block 238, the acceleration of the engaged clutch is determined at block 240, and then the engine acceleration and the clutch acceleration are summed to determine the clutch slip acceleration at block 242. Finally, the measured dynamic torque transferred across the engaged clutch is determined from the clutch slip acceleration. It should be appreciated that there are a number of ways to derive this value and that other terms, such as the known slip inertia for example, may have to be involved in the calculation. However, the manner in which the measured dynamic torque value is reached is not critical to this control method and is beyond the scope of this invention. The measured dynamic torque value is passed to process block 244 where it is summed with a predicted dynamic torque value.

The predicted dynamic torque value is derived at process block 246 by first predicting the value of the total torque that should be transferred across the engaged clutch given the target torque signal and based on known transmission responses to the input of that particular target torque signal. It should be appreciated that this predicted value may be retrieved from a stored look-up table or calculated directly. Then, at process block 248, a feedback signal of the steady state torque value that has been determined from the previous iteration through the engine speed control loop is subtracted from this predicted total torque value (from process block 246) to provide a predicted dynamic torque value. In other words, taking the target torque signal, which is composed of the dynamic torque signal and the steady-state torque signal, then predicting a total torque value that should be transferred across the engaged clutch for that target torque signal and summing it to (i.e., subtracting) the previously derived compensation for driving conditions (feedback of prior steady-state torque value) will leave as a remainder a value that represents the predicted dynamic torque signal portion of the target torque signal.

The measured dynamic torque is summed with the predicted dynamic torque value at process block 244 to determine if a dynamic torque error exists. A dynamic torque error represents the difference between the measured engine/clutch output and the predicted output that is expected for the given target torque input signal. This error indicates that changes in driving conditions have occurred that must be compensated for by making a correction to the target torque signal. More specifically, if a predicted, or expected output value of torque transfer should occur across the clutch for a particular target torque signal and the actual, or measured torque that occurs is different, then external factors (i.e., road and/or driving conditions) have occurred that are negatively influencing the torque transfer of the clutch.

Once the dynamic torque error has been determined at process block 244, it is integrated at process block 250 to provide the steady-state torque signal. As previously mentioned, the steady-state torque signal is summed with the dynamic torque signal at process block 236 to provide the target torque signal that represents the total amount of torque that must be transferred across the engaged clutch to cause the engine to track the target engine speed in response to both the throttle position and changes in driving conditions. It should be appreciated that since the steady-state torque value is a compensation value that is added to the dynamic torque signal when the measured torque output value differs from the predicted torque value, any other event that would also cause a difference in this value will trigger an errant steady-state compensation. To prevent this occurrence and to assist in maintaining the correct level of steady-state torque signal, an additional compensating value is added to the steady-state torque signal at process block 252.

In practical terms, the only event that would cause an errant correction by the steady-state torque compensation is a change in the throttle position. More specifically, if a change in throttle position is commanded, the target engine speed and thus the target torque signal will change instantaneously in response to the dynamic torque signal portion of the flowchart. However, since the steady-state torque signal is derived from the measured engine and clutch outputs, and there is a delay in the time it takes the engine to respond to the engine controller inputs based on throttle position changes, an errant steady-state torque compensation is produced. More precisely, due to the delay in measured engine response compared to the instantaneous changes in the predicted total torque and predicted dynamic torque values the steady-state torque signal is unable to change with equal speed thus causing an erroneous change in the steady-state torque value in effort to compensate. Therefore, at process block 252 a steady-state delay signal is added to the integrated dynamic torque error (from process block 250) to assist the steady-state torque value to quickly compensate for the change in commanded torque.

Starting at process block 254, the method of the present invention determines the steady-state delay by first predicting the value of the steady state torque signal based on inputs from an engine controller when a change in throttle position results in a new engine target speed. This predicted value corresponds to the correct steady-state value that should be produced in response to the new throttle position. Then, at process block 256, based on known engine response times to changes in the target torque signal, the delay in the time required for the engine to reach the new target engine speed and thus the delay in the steady-state torque reaching its proper level is predicted. It should be appreciated, as with the aforementioned predicted values, that this delay value may be retrieved from a stored look-up table or calculated directly. Finally, at process block 252, the predicted steady-state torque value (process block 256) is summed with the integrated dynamic torque error signal to provide the proper steady-state torque signal. In this manner, if an incorrect dynamic torque error is produced at process block 244, in response to the throttle position change, the integrated dynamic torque error is enhanced, by the summation of the steady-state delay signal at process block 252, so that the errant compensation is accounted for. This continues until expiration of the predicted delay in engine response (process block 258), so that the steady-state torque compensation (from process block 252) is reinstated once the effects from the delay in response to the change in throttle position pass. The method of the present invention as represented in FIGS. 3 and 4 provides an engine acceleration curve by raising the target engine speed as the clutch speed increases in response to the engine speed increasing as well as providing a compensation to the changing engine target speed for efficient and smooth operation as the driving conditions vary.

Those having ordinary skill in the art will appreciate that when using a target engine speed to develop an acceleration curve that is used to control the clutch engagement to regulate the speed of an accelerating engine, the term "target engine speed" and its associated concepts may involve a number of meanings in common practice and the terminology used here should be clearly understood. In general use, the phrase "target engine speed" is described herein in connection with an "engine speed control" scheme or strategy. As used herein, the term "engine speed control" may mean holding the engine to a specific speed (RPM), or limiting the engine to a specific speed, or controlling the engine speed (and thus, its acceleration) over its operating range. Thus, engine speed control using a target engine speed may use its target as either a static point, or as a dynamic control.

More specifically, as an engine is called upon to accelerate with an applied load (vehicle mass and inertia) that is connected though a drivetrain and a selected gear to the clutch of a transmission (in this case, a dual clutch transmission), a static target engine speed may be determined. The static target engine speed is a particular RPM value chosen that the engine speed will be allowed to accelerate to by the control of the torque transfer across the engaged clutch. As previously mentioned, the use of a static target engine speed alone in a method of controlling engine speed is not desirable for the dual clutch transmission. Thus, as discussed above, the method of the present invention provides an acceleration curve that is in actuality a constantly changing, or dynamic, target engine speed for the given throttle position and the selected gear based on the responsive changes in clutch speed. It may also be regarded as a curve formed from a series of continuously redetermined target engine speeds that the engine acceleration is allowed to follow, or track.

From the description that follows, it will be appreciated that the acceleration curve may be separated into portions having predetermined thresholds. The initial portion of the acceleration curve is first set using a static target engine speed, but as the engine speed changes the curve moves into a continuously redetermined target engine speed portion as the clutch speed rises. In this regard, another non-limiting embodiment of the present invention is generally indicated at 280 in FIG. 5. This embodiment includes a method of controlling the torque transferred across the engaged clutch of a vehicle having a dual clutch transmission to provide a predetermined engine acceleration curve for each gear. The method is based on the engine throttle position and subsequent changes of clutch speed in response to operatively increasing the torque transferred across the engaged clutch as the engine accelerates to a predetermined speed based on the throttle position is provided.

This method includes the steps of determining the engine throttle position, determining the currently engaged gear of the transmission, and sensing the speed of the driven member of the engaged clutch. Once these values are determined, the method selects an engine stall speed (from a look-up table) for the current gear and engine throttle position. The stall speed is the point at which an increasing transfer of torque across the engaged clutch will stop further engine acceleration and will hold the engine to a constant speed. The stall speed will be discussed in greater detail below. Using the stall speed, the method determines a target engine speed based on the engine stall speed and the clutch speed, then increases the torque transferred across the engaged clutch so as to cause the actual engine speed to increase and approach the target engine speed. As the engine accelerates, the method continuously redetermines the target engine speed to create the engine acceleration curve after the clutch speed reaches a predetermined percentage of the engine stall speed. The clutch speed increases in response to the increasing engine speed, thereby causing the engine speed to track the rising target engine speed of the engine acceleration curve. Finally, the method increases the torque transferred across the engaged clutch so as to operatively lock the clutch and engine together as the clutch speed reaches a predetermined multiple of the engine stall speed.

The method illustrated with reference to FIG. 5 allows the engine to accelerate while causing the increasing engine speed to follow an acceleration curve that is formed of separate control portions. The first portion of the acceleration curve involves a determination of an initial static target engine speed followed by a portion having continuously redetermined (dynamic) target engine speeds, followed finally by a portion of the curve in which the clutch speed has met the engine speed and the clutch is locked to the engine.

Figure 5:
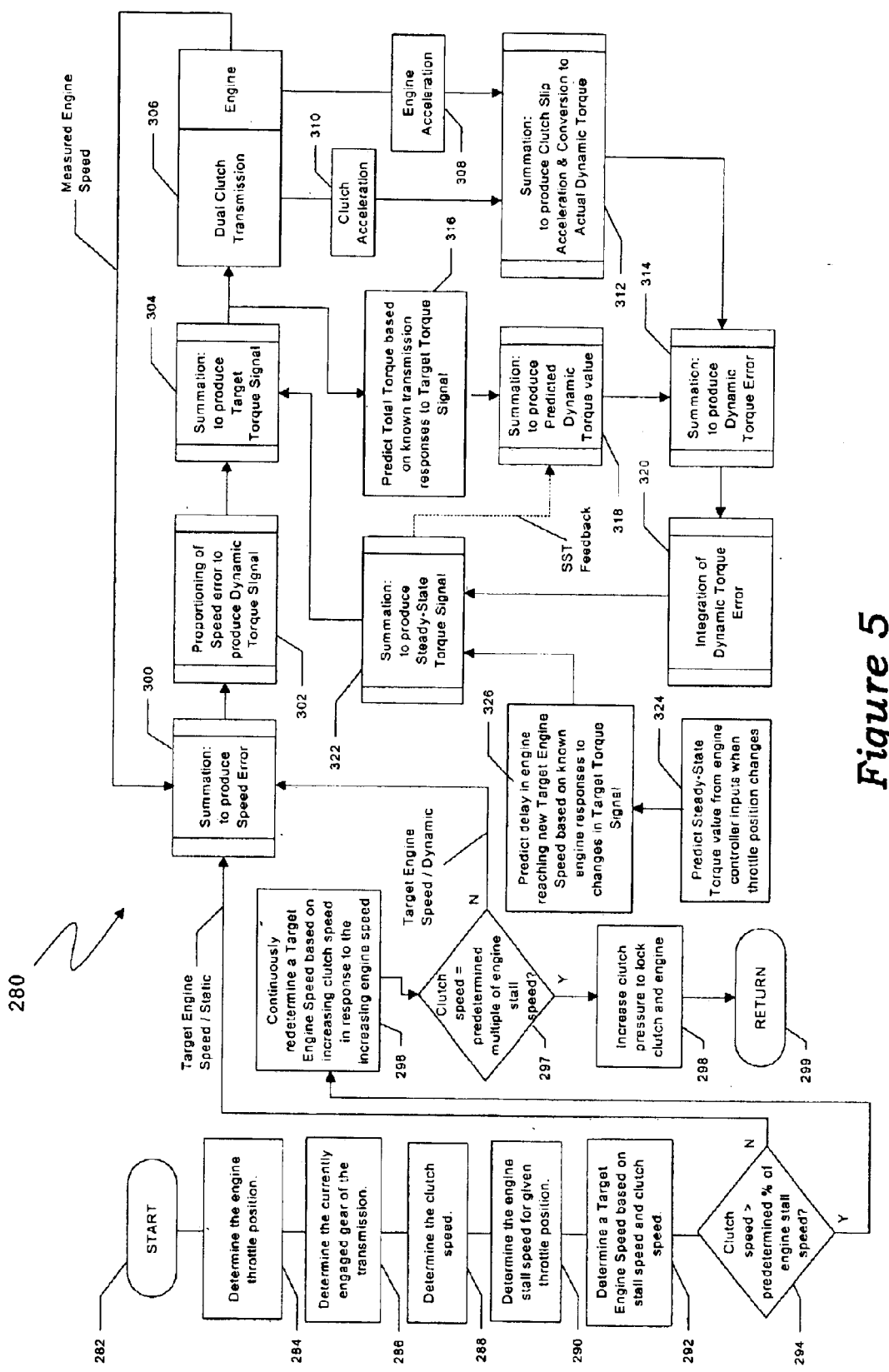
FIG. 5 is a block diagram flowchart of an additional embodiment of the method of the present invention for controlling a dual clutch transmission.

Referring to FIG. 5, once the ECU, or other control device, makes a determination that engine speed control is required, this embodiment of the method of the present invention is initiated at the start entry block 282. The flow path of the method steps then moves to process block 284, which determines the position of the engine throttle. Then, process block 286 determines the currently engaged gear of the transmission, which provides a reference as to the current operating range of the vehicle and to ascertain which of the two clutches is currently engaged and transferring torque. Process block 288 then determines the clutch speed and process block 290 determines the stall speed for this engine and clutch configuration given the throttle position (284).

The step of determining engine stall speeds is important to developing the acceleration curve in connection with the embodiment of the present invention illustrated in FIG. 5. In connection with an accelerating engine that is speed controlled by varying the torque transfer across a clutch, the term "engine stall speed" refers to the point at which the increasing clutch pressure causes the engine to no longer accelerate so that it holds to a constant RPM. The stall speed of the engine is dependant on the commanded throttle position, the currently engaged gear, the torque producing capability of the particular engine, and the torque transfer capability of the clutch assembly. It should be appreciated that the stall speed of an engine and clutch assembly may be derived in different manners, such as empirical testing or by mathematical modeling.

The engine stall speed is influenced by the commanded throttle position in the following manner. When the engine is commanded to accelerate from a low or idle speed by a throttle position change, the clutch engagement force, or pressure, and thereby the torque transferred across the clutch, may be increased to the point at which the clutch holds the engine to a constant speed. This is the engine stall speed for that particular throttle setting. The higher the commanded throttle position, the higher the stall speed. This means that the stall speed varies over a range in conjunction with the throttle position. Stall speeds essentially represent how the clutch effects the engine speed, so the stall speeds may be expressed in terms of the amount of clutch engagement force, or the amount of torque transferred across the clutch, or the clutch speed versus engine speed (i.e. clutch slip), at which the engine stops accelerating.

By extension, the range of the stall speeds is influenced by the selected gear and the particular engine used in the vehicle in the following manner. First, the selected gear has a secondary effect by the load that the particular gear places upon the driven member of the clutch. Secondly, the torque producing capability of the engine impacts the stall speed. For example, if two engines are joined with clutches having comparable torque transfer capabilities, the stall speeds of the engine that produces a given amount of torque, with the majority of the torque produced in the lower portion of the RPM range, will be lower than that of the engine producing roughly the same amount of torque but producing it higher in the RPM range. Additionally, it should be appreciated that the torque transferring capability of the particular clutch used will also have an influence on the stall speeds. Since stall speeds are consistent for any given throttle position across the range of throttle positions for each gear and for each particular engine and transmission configuration, once they have been determined, they are generally stored in a look-up or reference table.

In the initial portion of the engine acceleration curve, meaning as the engine is brought from the low end of its acceleration range, either in first gear from a vehicle standing start or from the acceleration following a gear change, the stall speed determined from process block 290 is used to set a static target engine speed. Since the stall speed is the point at which a highest clutch pressure for a given throttle position can be applied before the engine is caused to decelerate, it provides the maximum transfer of torque for the engine speed and thereby maximum vehicle acceleration for the engine at the particular throttle setting. This occurs because as the engine speed, and thereby the torque output, are held constant by the clutch engagement pressure as the engine attempts to accelerate to the throttle position, the clutch speed is still increasing and accelerating the vehicle. Thus, in this example of the method of the present invention, process block 292 sets the initial target engine speed to the engine stall speed. However, it should be appreciated that this approach of keeping the target engine speed at the stall speed has a practical limitation in that, for the given engine speed only a portion of the available torque output of the engine is reached. Also, the clutch speed will reach a limit relatively far below the engine speed, since the clutch pressure cannot be increased any further beyond holding the engine at stall speed or the engine speed and torque output will drop off. Thus, if only a single static target engine speed were used, as in some conventional methods known in the related art, the above mentioned drawbacks of drivability harshness will arise as the operator must continually increase the throttle position to command a higher engine speed, which would cause the engine speed to be controlled in distinct and noticeable stages. These control methods known in the related art also cause the operator to put the throttle to its highest setting each time an increase in engine speed is desired to achieve continued engine acceleration, resulting in loss of efficiency. However, the method of the present invention accounts for the static target engine speed limitation by entering into a dynamic portion of the acceleration curve at a predetermined threshold.

When employing a dynamic target engine speed, as in the method of the present invention, even if using a static target engine speed to initially accelerate the engine first toward the stall speed, there is a transitional point at which the clutch pressure, and thus the torque transfer, should be slightly reduced to allow the engine speed to increase. This transition point can be defined at a point where the clutch speed reaches some portion of the stall speed of the engine. The transition point is the initial control point of the engine speed control curve of the present invention and is made to occur at such a time as the increasing engine speed and clutch engagement will be smooth and efficient. This transition point will be discussed in greater detail below. However, when this first transition point is reached and the clutch pressure is slightly reduced allowing the engine speed to increase, the clutch speed will also increase until a second transitional point is reached. This second transition point is where the clutch speed meets the engine speed and the clutch and engine are essentially locked. The determination of the target engine speed is particularly important in this range, between the transition points, where the clutch allows the engine speed to rise.

As shown in FIG. 5, once process block 292 determines the stall speed and sets the target engine speed to that value, decision block 294 determines if the clutch speed has reached a transition point defined by a predetermined percentage of the engine stall speed. If the clutch speed has not yet reached this transition point, the static target engine speed is passed, as the target engine speed, to the remainder of the process beginning at process block 300. As will be discussed below, the remainder of the process will increase the torque transferred across the engaged clutch so as to cause the actual engine speed to increase and approach the target engine speed. However, once the clutch speed has reached, or exceeds, the transition point of the predetermined percentage of the engine speed, then the flow path continues to process block 296. The target engine speed is continuously re-determined in process block 296 to create the dynamic portion of the engine acceleration curve shown in FIG. 6. The clutch speed increases in response to the increasing engine speed thereby causing the engine speed to track the rising target engine speed of the dynamic portion of the engine acceleration curve.

Thus, as process block 296 is continuously redetermining the dynamic portion of the acceleration curve, decision block 297 determines if the clutch speed has reached another transition point defined by a predetermined multiple of the engine stall speed. If the clutch speed has not yet reached this transition point, the continuously redetermined dynamic target engine speed is passed to process block 300. However, once the clutch speed has reached, or exceeds, the transition point of the predetermined multiple of the engine speed, then the flow path continues to process block 298 which causes the ECU to increase the torque transferred across the engaged clutch so as to operatively lock the clutch and engine together. At this point, generally high in the engine RPM range, the clutch speed and the engine speed are equal and thus the acceleration curve will rise to the maximum for the given throttle position or other conditions (beyond the scope of this invention) are such that a gear shift will be performed. Process block 299 allows a return through the method steps or a departure from the acceleration curve if other operations (e.g. shifting) are to occur. It should be appreciated, however, that the throttle position may be changed to reflect a lower engine speed setting without a gear shift and the engine is similarly controlled in a deceleration curve.

In this manner, the method of the present invention also provides a predetermined engine deceleration curve for each gear based on the engine throttle position and subsequent changes of clutch speed that are in response to operatively varying the torque transferred across the engaged clutch, as the engine decelerates to a predetermined speed based on the throttle position. To accomplish this, the method further includes the steps of determining the currently engaged gear of the transmission and sensing the clutch speed when a reduction in the engine throttle position is detected. Then, the pressure applied to the engaged clutch is initially decreased in a linear manner as the engine decelerates thereby controlling the rate of vehicle deceleration. Further, an initial decelerating target engine speed is determined based on the currently engaged gear and the engine throttle position. Then, the torque transferred across the engaged clutch is varied to cause the engine speed to decelerate toward the initial decelerating target engine speed. After the decelerating clutch speed reaches a predetermined percentage of the initial decelerating target engine speed, due to the clutch response to the decreasing engine speed, the target engine speed is incrementally redetermined to create the engine deceleration curve thereby causing the engine speed to track the decreasing target engine speed of the engine deceleration curve. Finally, the torque transferred across the engaged clutch is continuously varied to cause the engine to decelerate along the engine deceleration curve.

Referring again to FIG. 5, process block 300 and the remainder of the blocks of FIG. 5 are functionally similar to those of FIG. 4. Thus, process block 300 determines the difference between the target engine speed and the actual engine speed, which is essentially determining the difference between the target engine acceleration curve and the actual (measured) engine speed by summing the two values to produce a speed error. The speed error from process block 300 is fed to process block 302, which determines a dynamic torque signal. Process block 302 represents a conversion circuit that changes the raw speed error value into an error signal that is proportioned relative to a predetermined range. The proportional error signal is the dynamic torque signal that represents the amount of torque that must be transferred across the engaged clutch to cause the engine to track the target engine speed curve in response to the throttle position. In other words, the actual engine speed is determined, the target engine speed curve is compared to the actual engine speed to produce a speed error signal, and the value of the speed error signal is proportioned to a relative value within a predetermined range to provide the dynamic torque signal. The dynamic torque signal is then used to form the basis for a target torque signal that is then used to vary the torque transfer across the engaged clutch to cause the engine to track the target engine speed.

The target torque signal is a composite signal that comprises the dynamic torque signal discussed above and a steady state torque signal. The term "dynamic" is used in this context to signify that the torque transfer across the engaged clutch is varied according to the difference between the target engine speed and the actual engine speed. Thus, the speed error is reduced as the actual engine speed closes on the target engine speed. The "steady state" torque signal represents an additional amount of torque that must be transferred across the engaged clutch to compensate for changes in driving conditions that would otherwise disrupt the speed control of the engine using the dynamic signal alone. The steady state torque signal is derived as the difference between predicted changes to the engine speed and the actual change based on known engine and transmission response times to changes in the target torque signal. Thus, the steady state torque signal is determined and added to the dynamic torque signal so that the dynamic torque signal will control the engine speed in a "steady state" manner without any detrimental influences from changing driving conditions.

Therefore, process block 304 sums the dynamic torque signal and the steady-state torque signal to provide a target torque signal that represents the total amount of torque that must be transferred across the engaged clutch to cause the engine to track the target engine speed in response to the throttle position and changes in the driving conditions. Then, the target torque signal is used to vary the torque transferred across the engaged clutch to cause the engine to track the target torque signal. This is shown in FIG. 5 by the flow path from process block 304 to the transmission and engine assembly represented by block 306. It should be appreciated that as the actual engine speed reaches, or is about to reach, a point on the target engine speed curve for the particular clutch speed from process block 294, another speed error is determined at process block 300 so that the engine is caused to accelerate and track the target engine speed curve, or that the engine is merely allowed to accelerate but be held to the target engine speed curve in relation to the clutch speed by process block 298. Regardless, a target engine speed curve is established that will provide control of the torque transferred across the engaged clutch for the given gear and throttle position.

To obtain a steady state torque signal that is summed with the dynamic torque signal at process block 304, a measured value representing the actual dynamic torque produced must be derived from the engine and clutch (block 306, FIG. 5). The measured dynamic torque is generally derived by calculations that use engine and transmission output measurements. For example, the acceleration of the engine is determined at block 308, the acceleration of the engaged clutch is determined at block 310, and then the engine acceleration and the clutch acceleration are summed to determine the clutch slip acceleration at block 312. Finally, the measured dynamic torque transferred across the engaged clutch is determined from the clutch slip acceleration. It should be appreciated that there are a number of ways to derive this value and that other terms, such as the known slip inertia for example, may have to be involved in the calculation. However, the manner in which the actual dynamic torque value is reached is not critical to this control method and is beyond the scope of this invention. The measured dynamic torque value is passed to process block 314 where it is summed with a predicted dynamic torque value.

The predicted dynamic torque value is derived at process block 316 by first predicting the value of the total torque that should be transferred across the engaged clutch given the target torque signal and based on known transmission responses to the input of that particular target torque signal. It should be appreciated that this predicted value may be retrieved from a stored look-up table or calculated directly. Then, at process block 318, a feedback signal of the steady state torque value that has been determined from the previous iteration through the engine speed control loop is subtracted from this predicted total torque value (from process block 316) to provide a predicted dynamic torque value. In other words, taking the target torque signal, which is composed of the dynamic torque signal and the steady-state torque signal, then predicting a total torque value that should be transferred across the engaged clutch for that target torque signal and summing it to (i.e., subtracting) the previously derived compensation for driving conditions (feedback of prior steady-state torque value) will leave as a remainder a value that represents the predicted dynamic torque signal portion of the target torque signal.

The measured dynamic torque is summed with the predicted dynamic torque value at process block 314 to determine if a dynamic torque error exists. A dynamic torque error represents the difference between the measured engine/clutch output and the predicted output that is expected for the given target torque input signal. This error indicates that changes in driving conditions have occurred that must be compensated for by making a correction to the target torque signal. More specifically, if a predicted, or expected output value of torque transfer should occur across the clutch for a particular target torque signal and the actual, or measured torque is different, then external factors (i.e., road and/or driving conditions) have occurred are negatively influencing the torque transfer of the clutch.

Once the dynamic torque error has been determined at process block 314, it is integrated at process block 320 to provide the steady-state torque signal. As previously mentioned, the steady-state torque signal is summed with the dynamic torque signal at process block 304 to provide the target torque signal that represents the total amount of torque that must be transferred across the engaged clutch to cause the engine to track the target engine speed in response to both the throttle position and changes in driving conditions. It should be appreciated that since the steady-state torque value is a compensation value that is added to the dynamic torque signal when the measured torque output value differs from the predicted torque value, any other event that would also cause a difference in this value will trigger an errant steady-state compensation. To prevent this occurrence and to assist in maintaining the correct level of steady-state torque signal, an additional compensating value is added to the steady-state torque signal at process block 322.

In practical terms, the only event that would cause an errant correction by the steady-state torque compensation is a change in the throttle position. More specifically, if a change in throttle position is commanded, the target engine speed and thus the target torque signal will change instantaneously in response to the dynamic torque signal portion of the flowchart. However, since the steady-state torque signal is derived from the measured engine and clutch outputs, and there is a delay in the time it takes the engine to respond to the engine controller inputs based on throttle position changes, an errant steady-state torque compensation is produced. More precisely, due to the delay in measured engine response compared to the instantaneous changes in the predicted total torque and predicted dynamic torque values the steady-state torque signal is unable to change with equal speed thus causing an erroneous change in the steady-state torque value in effort to compensate. Therefore, at process block 322 a steady-state delay signal is added to the integrated dynamic torque error (from process block 320) to assist the steady-state torque value to quickly compensate for the change in commanded torque.

Starting at process block 324, the method of the present invention determines the steady-state delay by first predicting the value of the steady state torque signal based on inputs from an engine controller when a change in throttle position results in a new engine target speed. This predicted value corresponds to the correct steady-state value that should be produced in response to the new throttle position. Then, at process block 326, based on known engine response times to changes in the target torque signal, the delay in the time required for the engine to reach the new target engine speed and thus the delay in the steady-state torque reaching its proper level is predicted. It should be appreciated, as with the aforementioned predicted values, that this delay value may be retrieved from a stored look-up table or calculated directly. Finally, at process block 322, the predicted steady-state torque value (process block 324) is summed with the integrated dynamic torque error signal to provide the proper steady-state torque signal. In this manner, if an incorrect dynamic torque error is produced at process block 314, in response to the throttle position change, the integrated dynamic torque error is enhanced by the summation of the steady-state delay signal at process block 322, so that the errant compensation is accounted for. This continues until expiration of the predicted delay in engine response (process block 326), so that the steady-state torque compensation (from process block 320) is reinstated once the effects from delay in response to the change in the throttle position pass.

To further refine the ability of the present invention to account for the desired driveability and comfort issue relating to the engagement of the clutches of the dual clutch transmission 10 and the rate of acceleration of the engine, and thus the vehicle, the method of the present invention also provides for the use of an equation in calculating the acceleration curve. The equation includes an operatively selectable control constant that directly influences the rate of increase of engine and clutch speed thus providing operative control over the ride characteristics of the vehicle.

Thus, the present invention also encompasses a method of controlling the pressure applied to the engaged clutch of a vehicle having a dual clutch transmission to control the torque transferred across the engaged clutch by employing a predetermined engine acceleration curve for each gear based on the engine throttle position and subsequent changes of clutch speed in response to operatively varying the pressure on the engaged clutch as the engine accelerates to a predetermined speed based on the throttle position. The method includes the steps of determining the engine throttle position, determining the currently engaged gear of the transmission, and sensing the speed of the driven member of the engaged clutch. Then, an engine stall speed for the current gear and engine throttle position is selected from a look-up table and a target engine speed is determined based on the engine stall speed. The torque transferred across the engaged clutch is increased so as to cause the engine speed to increase and approach the target engine speed thereby increasing the clutch speed and accelerating the vehicle. The pressure applied to the engaged clutch is then reduced to allow the engine to continue to accelerate toward the target engine speed when the clutch speed reaches a predetermined percentage of the engine stall speed thereby continuing to increase the clutch speed while at the same time accelerating the vehicle.

A target engine speed is continuously redetermining based on the engine stall speed and the clutch speed using a target engine speed equation that influences the rate of increase of engine and clutch speed after the clutch speed reaches the predetermined percentage of the engine stall speed. The target engine speed equation is defined as:

$$T = S + \frac{\{[C + [(K-2)*S]\}^2}{4*(K-1)*S} \quad (1)$$

wherein T is the target engine speed, S is the stall speed determined for the current gear and throttle position, C is the clutch speed, and K is a control constant. Using this equation in the method of the present invention, the clutch speed may be caused to increase in response to the increasing engine speed thereby causing the engine speed to track the rising target engine speed. Ultimately, the applied pressure on the engaged clutch is increased so as to operatively lock the clutch and engine together as the clutch speed reaches a predetermined multiple of the engine stall speed.

Essentially, the application of the equation provides a more detailed manner of determining the target engine speed in process block 294 through 297 of FIG. 5 as previously discussed to develop the acceleration curve. The curve and its associated components are graphically illustrated in FIG. 6. In FIG. 6, the relative throttle position over time is represented graphically and is generally indicated at 400. An increase in the throttle position is shown at 402. This change in throttle position may cause the ECU to initiate the method of the present invention by commanding engine acceleration. A decrease in throttle position is shown at 404. As generally indicated at 420 in FIG. 6, the related activity of the engine and the clutch are shown in reference to the determined target engine speed. Specifically, the clutch speed is shown as a solid line 406. Control of the torque transfer across the clutch attempts to cause the engine to track the target engine speed shown as a dotted line 408, thereby producing the resultant engine acceleration curve, generally indicated as the solid line at 410. To graph this interaction, speed as a relative value is designated on the vertical axis and time is indicated along the horizontal axis. The time reference for the lines at 420 corresponds with the time shown for the throttle position at 400 and likewise for the pressure curve, generally indicated at 440. The pressure curve 440 depicts the pressure applied to the engaged clutch to cause the engine to track the acceleration curve 410.

More specifically, and referring back to process block 298 in FIG. 5, the target engine speed is determined based on the currently engaged gear and the engine throttle position using an equation that includes a predetermined control constant that influences the rate of increase in engine and clutch speed, and thereby vehicle acceleration. This is also effectively the rate at which the clutch engages the engine, and corresponds to the relative harshness of the clutch engagement. At decision block 294 it is determined whether the clutch speed has reached or exceeded the first transition point. If decision block 294 determines that the clutch speed has not yet reached the first transition point, the "NO" path is followed and the engine stall speed, as the static target engine speed, is passed to process block 360, as shown in FIG. 5 and as graphically represented as the portion of the engine acceleration curve designated 412 in FIG. 6. In FIG. 6, the relative value of the engine stall speed for the given throttle position is shown as dotted horizontal line 422. The first transition point occurs along dotted vertical line 424 where the increasing clutch speed meets the predetermined percentage of the engine stall speed, shown as a horizontal dotted line 430.

If decision block 294 determines that the clutch speed has reached the first transition point, the "YES" path is followed and the above-mentioned equation is employed at process block 296 (FIG. 5) to continuously redetermine the dynamic target engine speed. The first solution to the equation provides a target engine speed for the particular instantaneous clutch speed, which is passed to process block 300 to sum with the measured (actual) engine speed to produce a difference, or error, between the target engine speed and the measured engine speed. This event is followed by the repetitive solutions to the equation that will provide the dynamic target engine speed (the portion of the engine acceleration curve designated 414 in FIG. 6) by repeatedly solving for the equation as the clutch speed increases in response to engine acceleration. Thus, not only is a single curve resolved for the particular throttle position in the particular selected gear, but a whole range of target engine curves are subsequently created for each possible throttle position in each available gear. It should be appreciated that the repetitive solution to the instantaneous equation may be controlled by a sampling rate or other incremental indexing rather than performing a non-stop refiguring of the target. It should be further appreciated that once the appropriate target engine speed curves are determined they may be stored and referred to rather than requiring the equation step (in process block 296) to continue as an on-going mathematical process.

With respect to the transition points that are determined by decision block 294 and 297, the stall speed and the control constant K are the defining factors. Generally speaking, from the equation (1) and FIG. 6, it can be seen that once the engine speed reaches and exceeds the first transition point and the equation is used (in block 296) to determine the dynamic target engine speed, the complex term added to the stall speed "S" causes the dynamic target engine speed to be initially set slightly higher than the stall speed. The clutch pressure is then slightly reduced to allow the engine to accelerate in further response to the commanded throttle position. This is graphically illustrated in FIG. 6 as the engine speed line 410 passes through the first transition point at dotted line 424 and begins its rise in the dynamic acceleration portion 414. Then, throughout the continuation of the dynamic acceleration portion 414 of the curve, as clutch speed (C) increases (406, FIG. 6), the target engine speed (T) increases (408, FIG. 6) at a lesser rate until the point at which the clutch speed and the engine speed are the same (the second transition point). As shown in FIG. 6, the second transition point occurs along the vertical dotted line 426 where the increasing clutch speed meets the predetermined multiple of the engine stall speed shown as horizontal dotted line 432.

The K value is important to setting the transition points of the target engine speed curve. The K value is a constant that controls the rate at which the clutch speed approaches the engine speed. Thus, the method of the present invention also provides selective control over the first transition point wherein the predetermined percentage of the engine stall speed is further defined as the relationship ([2−K]*S), where K is the chosen control constant and S is the stall speed for the given throttle position. This particular relationship is shown in FIG. 6 as the horizontal dotted line 430, which represents the predetermined percentage of the engine stall speed that sets the first transition point and is further indicated as the relative speed represented by the value ([2−K]*S).

Additionally, the method of the present invention also provides selective control over the second transition point that operatively locks the clutch and engine together by setting the predetermined multiple of the engine stall speed as the relationship (K*S), where K is the chosen control constant and S is the stall speed for the given throttle position. This particular relationship is shown in FIG. 6 as the horizontal dotted line 432, which represents the predetermined multiple of the engine stall speed that sets the second transition point and is further indicated as the relative speed represented by the value (K*S).

The goal of the engine acceleration curve of the present invention is not only to cause the engine to track the target engine speed, but also to cause the clutch to engage smoothly and with the most efficient transfer of engine torque. The K value and its relationship to the stall speed 422 determines the rate of the rise in the target engine speed 408 and the rate at which the clutch speed 406 meets the engine speed 410 thereby providing the relative "feel" or smoothness of the clutch engagement. The relative value of K controls the rate of clutch engagement and thus the rate of vehicle acceleration. Mathematically, K must be greater than 1 (one) and less than (two) 2. As the value for K is set closer to 1, the clutch engagement, and thus the vehicle ride, will be harsher with very rapid clutch engagement and sharper engine acceleration from the static target engine speed to a clutch locking event. In other words, setting the value of K closer to 1 brings the two transition points described by the vertical dotted lines 424 and 426 closer to the stall speed, so that the dynamic portion 141 of the acceleration curve 410 (between lines 424 and 426, FIG. 6) is much smaller. In this case, the clutch will lock up very quickly with hardly any clutch slip.

When the K value is selected closer to 2, the clutch engagement will be smoother and more prolonged, and thus the vehicle ride will be smoother with slower engine acceleration to the clutch lock point. The median K value of 1.5 is generally considered the best compromise of acceleration and smoothness for most current engines and vehicles. However, this is greatly influenced by the engine and clutch capabilities, as discussed above, as well as gear selection and vehicle weight. In this manner, the K value controls the relative smoothness of the vehicle's acceleration and harshness of the clutch engagement. It is an adjustable value that may be selected to provide a programmable variable based on a predetermined desired "characteristic" driving feel for any given vehicle. It should be appreciated that since the determination of target engine speed is based, in part, on the gear selected, then a different K value can be used for each gear, if so desired. It should be further appreciated that, given the flexibility provided by the K term, K can be adjusted within the framework of the present invention so as to function with any engine and dual clutch transmission combination, in any vehicle.

Those having ordinary skill in the art, should appreciate that in certain applications it may be desirable to further increase the smooth feel of the clutch to engine engagement by not actually completing a full clutch to engine lock up. Thus, the method of the present invention also provides the step of increasing the applied pressure on the engaged clutch as the clutch speed reaches a predetermined multiple of the engine stall speed so as to not operatively lock the clutch and engine together but allow a small predetermined amount of slip to occur to provide for a smooth transfer of motive force between the clutch and engine. This is graphically illustrated in FIG. 6 as the section located between the vertical dotted lines 426 and 428, also indicated as "lock or minimal slip." In this section, the clutch pressure indicted at 446 may either be a value high enough to cause the clutch and engine to lock as discussed above or be of some lesser predetermined pressure value which will allow for a minimal slip.

It should be still further appreciated that as each gear in the dual clutch transmission is prepared to accept torque to provide motive force to the vehicle, the on-coming clutch will enter a "standby" portion of the acceleration curve shown in graph 420. Thus, the method of the present invention provides for preparatory steps of performing a preparatory clutch pressure fill without a transfer of torque to the clutch that will be the engaged clutch for either first gear, or the gear immediately above or below the currently engaged gear. This is illustrated in FIG. 6 at 444 as the pressure initially increases along the clutch pressure line 442 in curve 440. The preparatory clutch pressure fill is performed with respect to the first gear clutch when the vehicle is stationary and the brake is applied and is performed with respect to any other gear immediately prior to a shift. The standby portion indicates that no engine acceleration has yet occurred but is representative of a period prior to the transfer of torque across the clutch that will drive the particular gear.

It should be still further appreciated that, while the method of the present invention is applicable in each gear of the dual clutch transmission, an additional requirement is necessary for first gear to launch the vehicle from a standing start. Thus, the method of the present invention also includes the steps of performing a predetermined nominal increase to the pressure applied to the clutch that drives first gear after the standby portion of the engine acceleration curve for first gear when first gear is engaged. This is illustrated in FIG. 6 at 448 as the pressure increases along the clutch pressure line 442 in the curve 440. The predetermined nominal pressure increase is performed so as to cause a slight forward creep of the vehicle in anticipation of increased torque transfer across the clutch to drive the vehicle forward. As shown in the "Creep" portion of the engine acceleration curve in FIG. 6, creep is determined for first gear that is representative of the predetermined nominal pressure increase to the clutch indicating that only slight engine acceleration has occurred that is representative of the period immediately prior to the transfer of torque across the clutch that will drive the first gear.

It should be still further appreciated that in a like manner, the method of the present invention also provides a predetermined engine deceleration curve for each gear based on the engine throttle position and subsequent changes of clutch speed in response to operatively varying the pressure on the engaged clutch, as the engine decelerates to a predetermined speed based on the throttle position. Thus, the method further includes the steps of determining the currently engaged gear of the transmission, sensing the clutch speed when a change in the engine throttle position indicating a commanded deceleration is detected, and decreasing the pressure as applied to the engaged clutch initially in a linear manner as the engine decelerates thereby controlling the rate of vehicle deceleration. Then, the method selects an engine stall speed for the current gear and engine throttle position from a look-up table. Using the engine stall speed, the method determines a target engine speed based on the engine stall speed and the clutch speed using a target engine speed equation that influences the rate of decrease of clutch engagement pressure. The target engine speed equation is defined as, $$T = S + \frac{\{[C + [(K-2)*S]]\}^2}{4*(K-1)*S} \quad (2)$$

wherein T is the target engine speed, S is the stall speed determined for the current gear and throttle position, C is the clutch speed, and K is a control constant. The method then controls the reduction in the pressure applied to the engaged clutch causing the engine speed to decelerate toward the target engine speed when the clutch speed reaches a predetermined percentage of the engine stall speed. The target engine speed is continuously redetermined after the clutch speed reaches the predetermined percentage of the engine stall thereby causing the engine speed to track the decreasing target engine speed.

The deceleration curve is graphically illustrated in FIG. 6 as a continuation of the acceleration curve 410. Specifically, if a condition exists where the transmission does not or cannot shift into a higher gear, the engine will eventually begin to decelerate and the curve 410 will pass the 428 line as illustrated in FIG. 6. It should also be appreciated that the 410 curve may also be entered into after a downshift in which further engine deceleration is required. Regardless, in response to the reduced throttle position that reflects a commanded downshift, a deceleration stall speed is determined. The deceleration stall speed $(S)_{Decel}$ is shown in FIG. 6 as the dotted horizontal line 434. In a similar manner to the first and second transition points which occur during the engine acceleration, there are two deceleration transition points that occur at dotted vertical lines 450 and 452. These deceleration transition points are located at the points where the $(K*S)_{Decel}$ (at dotted line 436) and $([2-K]*S)_{Decel}$ (at dotted line 438) relationships occur and are substantially identical to those previously discussed above but utilize the deceleration stall speed $(S)_{Decel}$ for the given lowered throttle position.

Therefore, the method of the present invention provides a determination of a target engine speed that is based on the currently engaged gear and the engine throttle position by employing a repetitively determined control constant which influences the rate at which the clutch engages the engine. The control constant K providing the relative "feel" or smoothness of the clutch engagement. In this manner, the present invention provides an engine acceleration curve (FIG. 6) that allows for the predetermined selection of the relative smoothness of the vehicle's acceleration and harshness of the clutch engagement by the varying of the control constant as applied in the equation (1). Likewise, the method provides for an engine deceleration curve, which accomplish these same goals. Thus, the method of the present invention overcomes the drawbacks and disadvantages of all dual clutch transmission engine speed control schemes of the prior art.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A method of controlling the torque transferred across the engaged clutch of a vehicle having a dual clutch transmission to provide a predetermined engine acceleration curve for each gear based on the engine throttle position and subsequent changes of clutch speed as the engine accelerates to a predetermined speed based on the throttle position, said method includes the steps of:

sensing the engine throttle position;

determining the currently engaged gear of the transmission;

sensing the speed of the driven member of the engaged clutch;

determining a target engine speed based on the engine throttle position, the currently engaged gear, and the clutch speed;

determining a dynamic torque signal that represents the amount of torque that must be transferred across the engaged clutch to cause the engine to track the target engine speed in response to the throttle position;

determining a steady-state torque signal that represents an additional amount of torque that must be transferred across the engaged clutch to compensate for changes in driving conditions;

summing the dynamic torque signal and the steady-state torque signal to provide a target torque signal that represents the total amount of torque that must be transferred across the engaged clutch to cause the engine to track the target engine speed in response to the throttle position and changes in the driving conditions; and continuously varying the torque transferred across the engaged clutch to cause the engine to accelerate toward and track the target torque signal.

2. A method of controlling the torque transferred across the engaged clutch of a vehicle having a dual clutch transmission as set forth in claim 1 wherein the step of determining a dynamic torque signal further includes the steps of:
  determining the actual engine speed;
  comparing the target engine speed to the actual engine speed and producing a speed error signal; and
  proportioning the value of the speed error signal to a relative value within a predetermined range to provide the dynamic torque signal.

3. A method of controlling the torque transferred across the engaged clutch of a vehicle having a dual clutch transmission as set forth in claim 2 wherein the step of determining a steady-state torque signal further includes the steps of:
  predicting the value of the steady state torque signal based on inputs from an engine controller when a change in throttle position results in a new engine target speed;
  predicting the delay in the engine reaching the new target engine based on known engine response times to changes in the target torque signal; and
  summing the predicted delay with the integrated dynamic torque error signal to provide the steady-state torque signal.

4. A method of controlling the torque transferred across the engaged clutch of a vehicle having a dual clutch transmission as set forth in claim 1 wherein the step of determining a steady-state torque signal further includes the steps of:
  determining the acceleration of the engine;
  determining the acceleration of the engaged clutch;
  summing the engine acceleration and the clutch acceleration to determine the clutch slip acceleration;
  determining the actual dynamic torque transferred across the clutch from the clutch slip acceleration;
  predicting a dynamic torque value that should be transferred across the engaged clutch for the given target torque signal; determining a dynamic torque error by summing the actual dynamic torque and the predicted dynamic torque value, wherein this sum indicates that changes in driving conditions have occurred that must be compensated for by making a correction to the target torque signal; and
  determining the steady-state torque signal by integrating the dynamic torque error, wherein this integration is the corrective value.

5. A method of controlling the torque transferred across the engaged clutch of a vehicle having a dual clutch transmission as set forth in claim 4 wherein the step of predicting a dynamic torque value further includes:
  predicting the value of the total torque that should be transferred across the engaged clutch given the target torque signal, based on known transmission responses to the input of the target torque signal; subtracting a feedback signal of the steady state torque value from the predicted total torque value to provide a predicted dynamic torque value.

6. A method of controlling the torque transferred across the engaged clutch of a vehicle having a dual clutch transmission as set forth in claim 1 wherein said method further includes the steps of:
  determining the currently engaged gear of the transmission and sensing the clutch speed when a reduction in the engine throttle position is detected;
  decreasing the pressure as applied to the engaged clutch as the engine decelerates thereby controlling the rate of vehicle deceleration;
  determining an initial decelerating target engine speed based on the currently engaged gear and the engine throttle position;
  varying the torque transferred across the engaged clutch to cause the engine speed to decelerate toward the initial decelerating target engine speed;
  incrementally redetermining the target engine speed after the clutch speed reaches a predetermined percentage of the initial target engine speed due to the clutch response to the decreasing engine speed thereby causing the engine speed to track the decreasing target engine speed of said engine deceleration curve; and
  continuously varying the torque transferred across the engaged clutch to cause the engine to decelerate along said engine deceleration curve.

7. A method of controlling the torque transferred across the engaged clutch of a vehicle having a dual clutch transmission as set forth in claim 6 wherein the step of continually redetermining the target engine speed further includes the steps of:
  determining a dynamic torque signal that represents the amount of torque that must be transferred across the engaged clutch to cause the engine to track the target engine speed in response to the throttle position;
  determining a steady-state torque signal that represents an additional amount of torque that must be transferred across the engaged clutch to compensate for changes in driving conditions;
  summing the dynamic torque signal and the steady-state torque signal to provide a target torque signal that represents the total amount of torque that must be transferred across the engaged clutch to cause the engine to track the target engine speed in response to the throttle position and changes in the driving conditions; and
  varying the torque transferred across the clutch to cause the engine to track the target torque signal.

8. A method of controlling the torque transferred across the engaged clutch of a vehicle having a dual clutch transmission as set forth in claim 6 wherein the step of determining a dynamic torque signal further includes the steps of:
  determining actual engine speed;
  comparing the target engine speed to the actual engine speed and producing a speed error signal; and
  proportioning the value of the speed error signal to a relative value within a predetermined range to provide the dynamic torque signal.

9. A method of controlling the torque transferred across the engaged clutch of a vehicle having a dual clutch transmission as set forth in claim 8 wherein the step of determining a steady-state torque signal further includes the steps of:
  predicting the value of the steady state torque signal based on inputs from an engine controller when a change in throttle position results in a new engine target speed;
  predicting the delay in the engine reaching the new target engine, based on known engine response times to changes in the target torque signal; and
  summing the predicted delay with the integrated dynamic torque error signal to provide the steady-state torque signal.

10. A method of controlling the torque transferred across the engage clutch of a vehicle having a dual clutch transmission as set forth in claim 8 wherein the step of predicting a dinamic torque value further includes:

predicting the valve of the total torque that should be transferred across the engaged clutch given the target torque signal based on known transmission responses to the input of the target torque signal;

subtracting a feedback signal of the steady state torque value from the predicted total torque value to provide a predicted dynamic torque value.

11. A method of controlling the torque transferred across the engaged clutch of a vehicle having a dual clutch transmission as set forth in claim 6 wherein the step of determining a steady-state torque signal further includes the steps of:

determining the acceleration of the engine;

determining the acceleration of the engaged clutch;

summing the engine acceleration and the clutch acceleration to determine the clutch slip acceleration;

determining the actual dynamic torque transferred across the clutch from the clutch slip acceleration;

predicting a dynamic torque value that should be transferred across the engaged clutch for the given target torque signal;

determining a dynamic torque error by summing the actual dynamic torque and the predicted dynamic torque value, wherein this sum indicates that changes in driving conditions have occurred that must be compensated for by making a correction to the target torque signal; and determining the steady-state torque signal by integrating the dynamic torque error, wherein this integration is the corrective value.

12. A method of controlling the torque transferred across the engaged clutch of a vehicle having a dual clutch transmission to provide a predetermined engine acceleration curve for each gear based on the engine throttle position and subsequent changes of clutch speed in response to operatively increasing the torque transferred across the engaged clutch as the engine accelerates to a predetermined speed based on the throttle position, said method includes the steps of:

determining the engine throttle position;

determining the currently engaged gear of the transmission;

sensing the speed of the driven member of the engaged clutch;

selecting an engine stall speed for the current gear and engine throttle position at which an increasing transfer of torque across the engaged clutch will stop further engine acceleration and will hold the engine to a constant speed, from a look-up table;

determining a target engine speed based on the engine stall speed;

increasing the torque transferred across the engaged clutch so as to cause the actual engine speed to increase and approach the target engine speed;

continuously redetermining the target engine speed after the clutch speed reaches a predetermined percentage of the engine stall speed, the clutch speed increasing in response to the increasing engine speed thereby causing the engine speed to track the rising target engine speed of said engine acceleration curve; and increasing the torque transferred across the engaged clutch so as to operatively lock the clutch and engine together as the clutch speed reaches a predetermined multiple of the engine stall speed.

\* \* \* \* \*